(12) United States Patent
Weiss et al.

(10) Patent No.: US 8,028,130 B1
(45) Date of Patent: Sep. 27, 2011

(54) PIPELINE STRUCTURE FOR A SHARED MEMORY PROTOCOL

(75) Inventors: Steven F. Weiss, San Diego, CA (US); Andrew E. Phelps, Encinitas, CA (US); Patricia Shanahan, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 1386 days.

(21) Appl. No.: 10/895,812

(22) Filed: Jul. 21, 2004

Related U.S. Application Data

(60) Provisional application No. 60/489,086, filed on Jul. 22, 2003.

(51) Int. Cl.
G06F 13/00 (2006.01)
G06F 13/28 (2006.01)
G06F 7/38 (2006.01)
G06F 9/00 (2006.01)
G06F 9/44 (2006.01)

(52) U.S. Cl. .......... 711/140; 711/169; 712/226
(58) Field of Classification Search .......... 711/169, 711/140; 712/226
See application file for complete search history.

(56) References Cited

U.S. PATENT DOCUMENTS

| | | | |
|---|---|---|---|
| 5,592,625 A | 1/1997 | Sandberg | |
| 5,918,229 A | 6/1999 | Davis et al. | |
| 6,266,750 B1 * | 7/2001 | DeMone et al. | 711/169 |
| 6,295,585 B1 | 9/2001 | Gillett, Jr. et al. | |
| 6,314,501 B1 | 11/2001 | Gulick et al. | |
| 2001/0000819 A1 * | 5/2001 | Manning | 711/168 |
| 2001/0013089 A1 * | 8/2001 | Weber | 711/146 |
| 2004/0128462 A1 * | 7/2004 | DeSota et al. | 711/169 |
| 2004/0148470 A1 * | 7/2004 | Schulz | 711/137 |

OTHER PUBLICATIONS

Charlesworth, Alan; The Sun Fireplane System Interconnect; Sun Microsystems, Inc.; Paper to appear at SC2001 Conference Nov. 2001; Denver; pp. 1-14.

* cited by examiner

*Primary Examiner* — Edward Dudek, Jr.
(74) *Attorney, Agent, or Firm* — Meyertons, Hood, Kivlin, Kowert & Goetzel, P.C.; Stephen J. Curran

(57) ABSTRACT

A method and apparatus for implementation of a pipeline structure for data transfer. A request is received from a first domain to access a second domain during a first clock cycle. A pipeline structure is used to perform at least a portion of the request during a subsequent clock cycle.

29 Claims, 8 Drawing Sheets

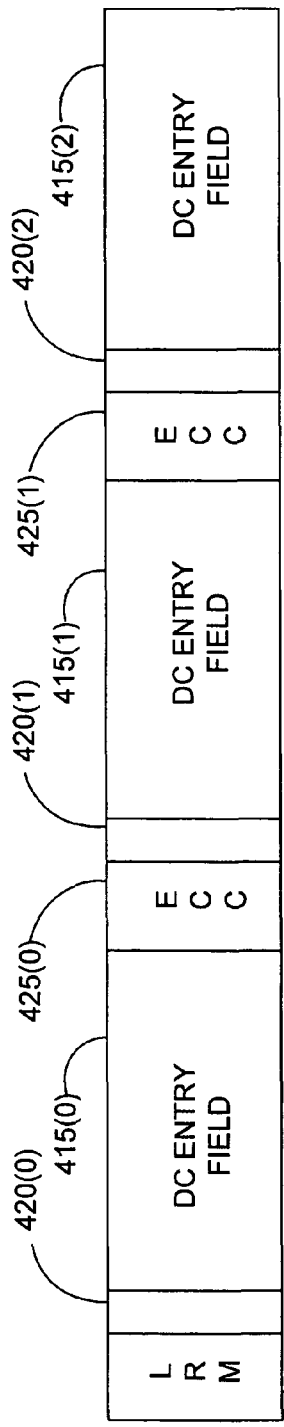
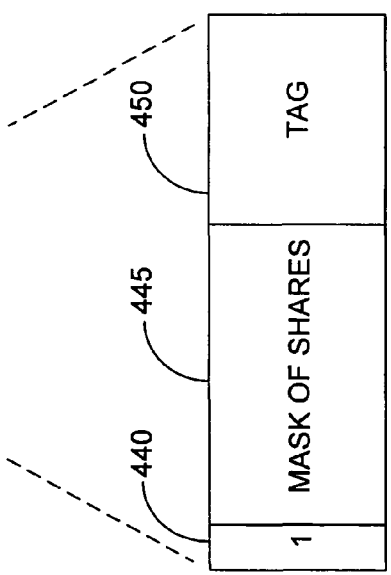
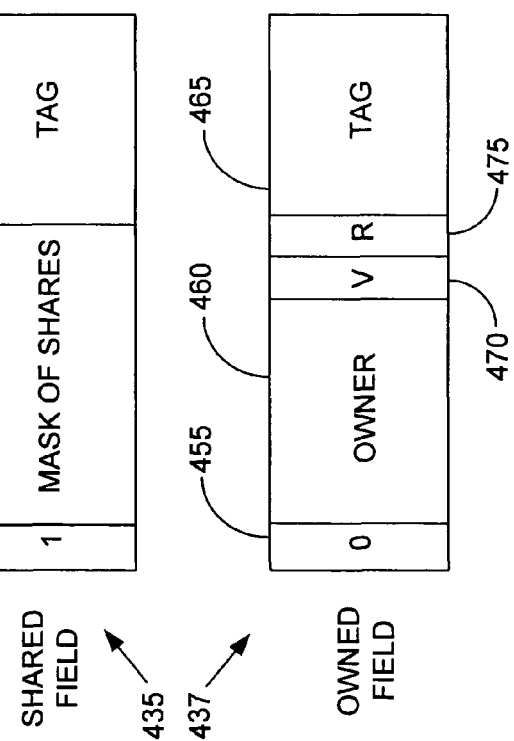
Figure 4A
Figure 4B
Figure 4C

PIPELINE STRUCTURE FOR A SHARED MEMORY PROTOCOL

This application claims priority to provisional U.S. Patent Application Ser. No. 60/489,086 filed on Jul. 22, 2003 entitled "PIPELINE STRUCTURE FOR A SHARED MEMORY PROTOCOL" by Weiss et al.

BACKGROUND OF THE INVENTION

1. Field of the Invention

This invention relates generally to processor-based systems, and, more particularly, to providing a higher bandwidth, lower-latency implementation of a scaled shared memory (SSM) protocol.

2. Description of the Related Art

Businesses typically rely on network computing to maintain a competitive advantage over other businesses. As such, developers, when designing processor-based systems for use in network-centric environments, may take several factors into consideration to meet the expectation of the customers, factors such as functionality, reliability, scalability, and performance of such systems.

One example of a processor-based system used in a network-centric environment is a mid-range server system. A single mid-range server system may have a plurality of system boards that may, for example, be configured as one or more domains, where a domain, for example, may act as a separate machine by running its own instance of an operating system to perform one or more of the configured tasks.

A mid-range server, in one embodiment, may employ a distributed shared memory system, where processors from one system board can access memory contents from another system board. The union of all of the memories on the system boards of the mid-range server comprises a distributed shared memory (DSM).

One method of accessing data from other system boards within a system is to broadcast a memory request on a common bus. For example, if a requesting system board desires to access information stored in a memory line residing in a memory of another system board, the requesting system board typically broadcasts on the common bus its memory access request. All of the system boards in the system may receive the same request and the system board whose memory address ranges match the memory address provided in the memory access request may then respond.

The broadcast approach for accessing contents of memories in other system boards may work adequately when a relatively small number of system boards are present in a system. However, such an approach may be unsuitable as the number of system boards grows. As the number of system boards grows, so does the number of memory access requests, thus to handle this increased traffic, larger and faster buses may be needed to allow the memory accesses to complete in a timely manner. Operating a large bus at high speeds may be problematic because of electrical concerns, in part, due to high capacitance, inductance, and the like. Furthermore, a larger number of boards within a system may require extra broadcasts, which could further add undesirable delays and may require additional processing power to handle the extra broadcasts.

Designers have proposed the use of directories in a distributed shared memory system to reduce the need for globally broadcasting memory requests. Typically, each system board serves as a home board for memory lines within a selected memory address range, and where each system board is aware of the memory address ranges belonging to the other system boards within the system. Each home board generally maintains its own directory for memory lines that fall within its address range. Thus, when a requesting board desires to access memory contents from another board, instead of generally broadcasting the memory request in the system, the request is transmitted to the appropriate home board. The home board may consult its directory and determine which system board is capable of responding to the memory request and identify any system boards that need to be informed of the request.

Directories are generally effective in reducing the need for globally broadcasting memory requests during memory accesses. However, implementing a directory that is capable of mapping every memory location within a system board generally represents a significant memory overhead. As such, directory caches are often designed to hold only mappings for a subset of the total memory. The system typically must use some other method, such as broadcasting, to resolve requests for memory that are not currently mapped in the directory cache.

Communication requests between the multiple boards described above (e.g., the requesting board and the home board) generally cause them to develop a client/server relationship. Communications between the multiple boards with client/server relationships may experience an inherent latency of operation during communications between the client and the server. Many times, several system clock cycles may pass during which no significant activity relating to transactions between the client and the server is accomplished. This results in communication latency, which may adversely affect the operation of the server.

Often, latency in communications between the requesting board and the home board may cause several portions of a transaction request to be placed in a queue. An appreciable number of requests may be queued, which may slow the operation of the server. While transaction requests are queued, several system clock cycles may be bypassed due to the latency of communication operations. This may cause a backlog to develop in a queue, which may slow the operation of the server.

The present invention is directed to overcoming, or at least reducing, the effects of, one or more of the problems set forth above.

SUMMARY

In one aspect of the present invention, a method is provided for implementation of a pipeline structure for data transfer. A request is received from a first domain to access a second domain during a first clock cycle. A pipeline structure is used to perform at least a portion of the request during a subsequent clock cycle.

In another aspect of the present invention, a method is provided for implementation of a pipeline structure for data transfer. A request is received from a first domain to access a second domain during a first clock cycle. A determination is made as to whether a latency of operation relating to the request is above a predetermined threshold. A latency reduction process is performed in response to the determination that the latency of operation relating to the request is above a predetermined threshold. The latency reduction process includes using a pipeline protocol to perform at least a portion of the request during a clock cycle substantially immediately following the first clock cycle.

In another aspect of the instant invention, an apparatus is provided for the implementation of a pipeline structure for data transfer. The apparatus of the present invention includes an interface and a first control unit that is communicatively coupled to the interface. The first control unit is adapted to: receive a request from a first domain for data that is storable in a resource associated with a second domain during a first clock cycle; access the data from the resource associated with the second domain using a pipeline structure unit; provide the data to the first domain based upon a pipeline structure provided by the pipeline structure unit; and to provide an indication to the first domain in response to providing the data.

In yet another aspect of the present invention, a computer readable program storage device encoded with instructions is provided for implementation of a pipeline structure for data transfer. A computer readable program storage device encoded with instructions that, when executed by a computer, performs a method, which comprises: receiving a request from a first domain to access a second domain during a first clock cycle; and using a pipeline structure to perform at least a portion of the request during a subsequent clock cycle.

BRIEF DESCRIPTION OF THE DRAWINGS

FIGS. 4A, 4B, and 4C illustrate a directory cache entry that may be implemented in the system of FIG. 1, in accordance with one illustrative embodiment of the present invention.

Figure 1:
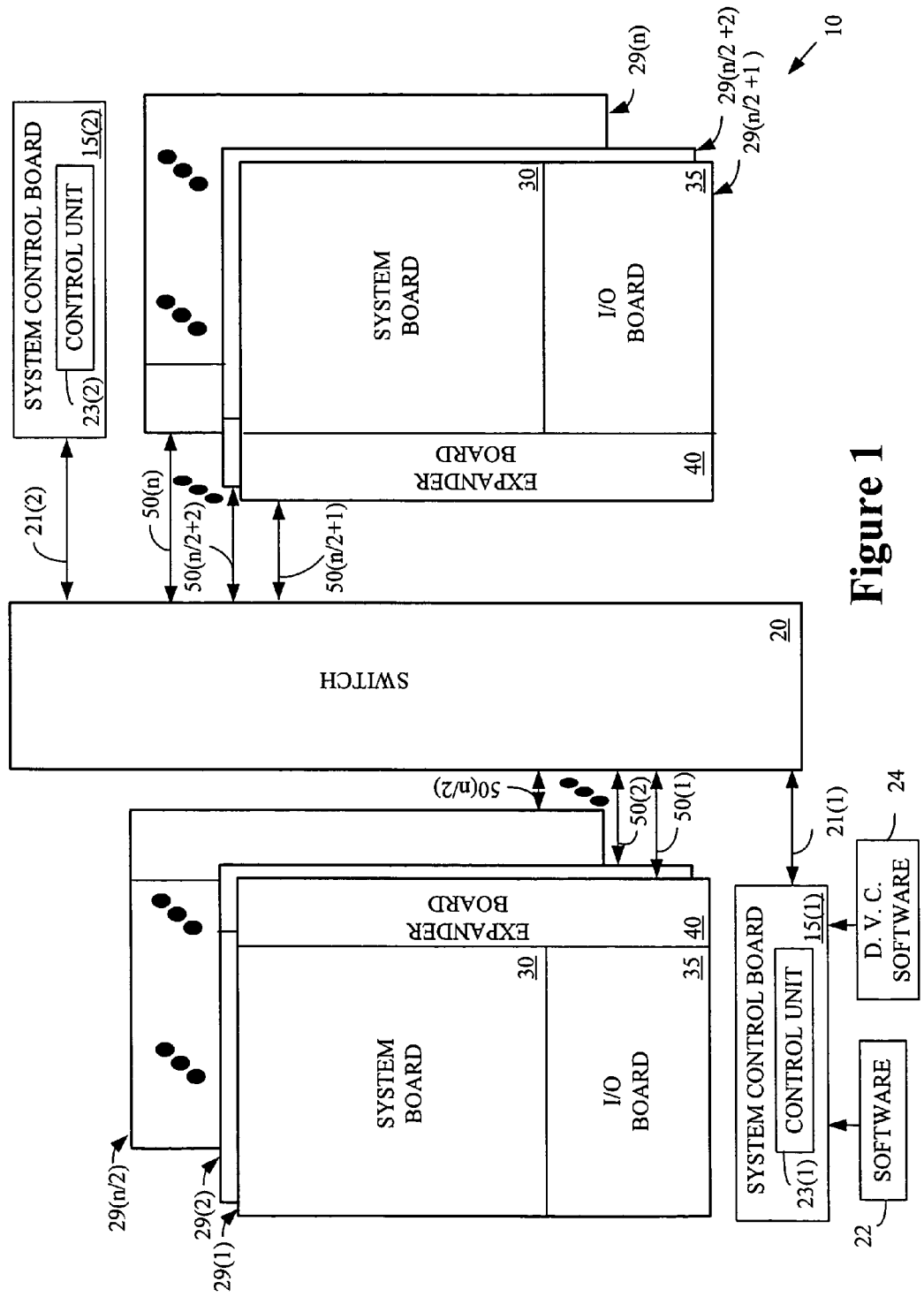
FIG. 1 illustrates a block diagram depiction of a system in accordance with one illustrative embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Embodiments of the present invention provide for improving the bandwidth relating to communications between multiple portions of a server system. The improvements in the bandwidth provided by embodiments of the present invention may be used to reduce the latency of communications between a plurality of portions of the server system. Embodiments of the present invention provide for implementing a pipeline structure such that substantially every clock cycle of a system clock may be used to implement or execute at least a portion of a transaction into the pipeline structure. Embodiments of the present invention provide for reducing the latency of communication systems for improved response to a transaction request made by a portion of a server system.

Turning now to FIG. 1, a block diagram depiction of a system 10, in accordance with one illustrative embodiment of the present invention, is provided. The system 10, in one embodiment, includes a plurality of system control boards 15(1-2) that are coupled to a switch 20. For illustrative purposes, lines 21(1-2) are utilized to show that the system control boards 15(1-2) are coupled to the switch 20, although it should be appreciated that, in other embodiments, the boards 15(1-2) may be coupled to the switch 20 in any of a variety of ways, including by edge connectors, cables, or other available interfaces.

In the illustrated embodiment, the system 10 includes two control boards 15(1-2), one for managing the overall operation of the system 10 and the other to provide redundancy and automatic failover in the event that the other board fails. Although not so limited, in the illustrated embodiment, the first system control board 15(1) serves as a "main" system control board, while the second system control board 15(2) serves as an alternate hot-swap replaceable system control board. In one embodiment, during any given moment, generally one of the two system control boards 15(1-2) actively controls the overall operations of the system 10.

If failures of the hardware or software occur on the main system control board 15(1), or failures on any hardware control path from the main system control board 15(1) to other system devices occur, the system controller failover software 22 automatically triggers a failover to the alternative control board 15(2). The alternative system control board 15(2), in one embodiment, assumes the role of the main system control board 15(1) and takes over the responsibilities of the main system control board 15(1). To accomplish the transition from the main system control board 15(1) to the alternative system control board 15(2), it may be desirable to replicate the system controller data, configuration, and/or log files on both of the system control boards 15(1-2). The system control boards 15(1-2) in the illustrated embodiment may each include a respective control unit 23(1-2).

The system 10, in one embodiment, includes a plurality of system board sets 29(1-n) that are coupled to the switch 20, as indicated by lines 50(1-n). The system board sets 29(1-n) may be coupled to the switch 20 in one of several ways, including edge connectors or other available interfaces. The switch 20 may serve as a communications conduit for the plurality of system board sets 29(1-n), half of which may be connected on one side of the switch 20 and the other half on the opposite side of the switch 20.

The switch 20, in one embodiment, may allow system board sets 29(1-n) to communicate, if desired. Thus, the switch 20 may allow the two system control boards 15(1-n)

to communicate with each other or with other system board sets 29(1–n), as well as allow the system board sets 29(1–n) to communicate with each other.

The system board sets 29(1–n), in one embodiment, comprise one or more boards, including a system board 30, I/O board 35, and expander board 40. The system board 30 may include processors and associated memories for executing, in one embodiment, applications, including portions of an operating system. The I/O board 35 may manage I/O cards, such as peripheral component interface cards and optical cards that are installed in the system 10. The expander board 40, in one embodiment, generally acts as a multiplexer (e.g., 2:1 multiplexer) to allow both the system board 30 and I/O board 35 to interface with the switch 20, which, in some instances, may have only one slot for interfacing with both boards 30, 35.

In one embodiment, the system 10 may be dynamically subdivided into a plurality of system domains, where each domain may have a separate boot disk (to execute a specific instance of the operating system, for example), separate disk storage, network interfaces, and/or I/O interfaces. Each domain, for example, may operate as a separate machine that performs a variety of user-configured services. For example, one or more domains may be designated as an application server, a web server, database server, and the like. In one embodiment, each domain may run its own operating system (e.g., Solaris operating system) and may be reconfigured without interrupting the operation of other domains.

Figure 2:
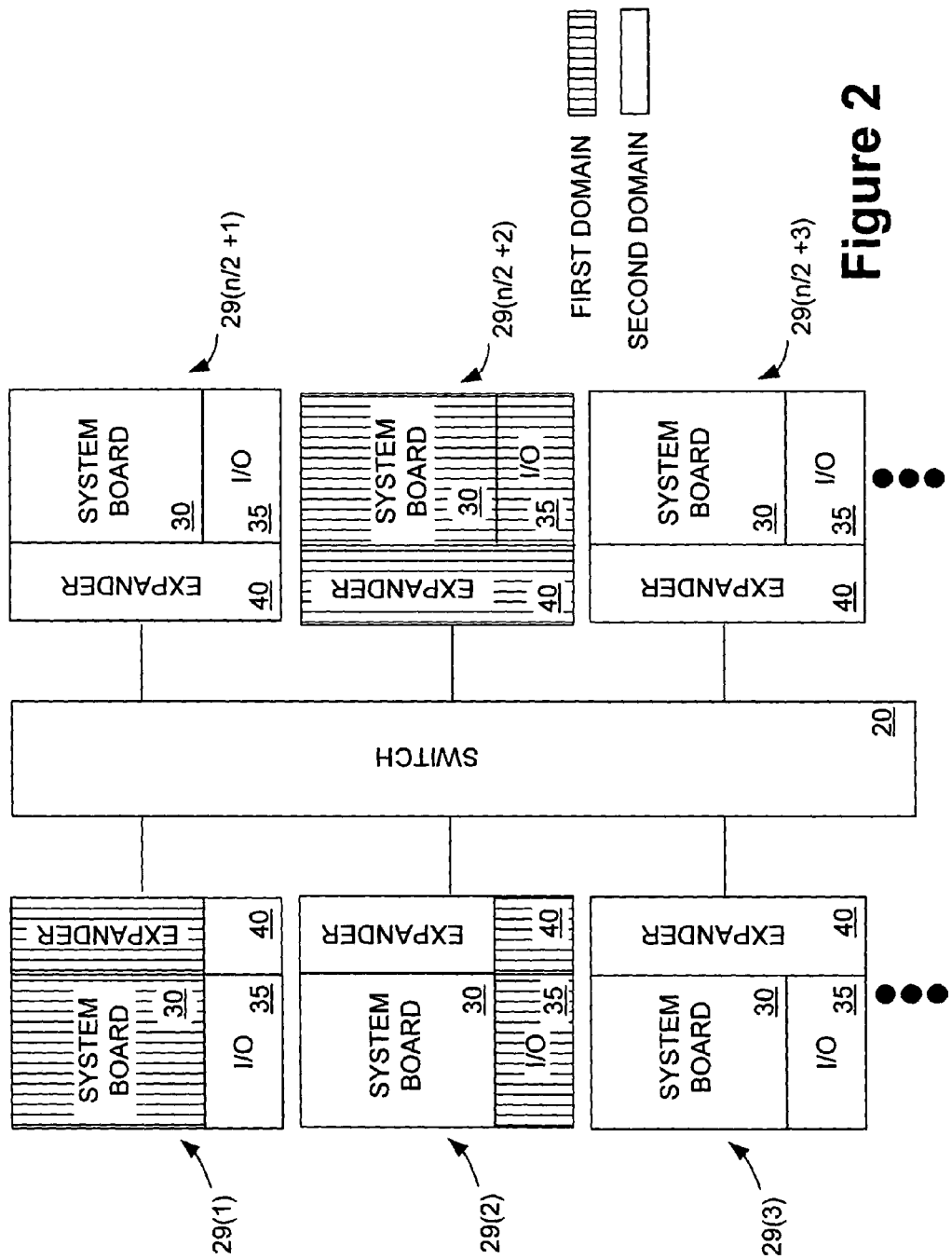
FIG. 2 illustrates a block diagram depiction of an illustrative domain configuration that may be implemented in the system of FIG. 1, in accordance with one illustrative embodiment of the present invention.

FIG. 2 illustrates an exemplary arrangement where at least two domains are defined in the system 10. The first domain, identified by vertical cross-sectional lines, includes the system board set 29(n/2+2), the system board 30 of the system board set 29(1), and the I/O board 35 of the system board set 29(2). The second domain in the illustrated embodiment includes the system board sets 29(3), 29(n/2+1), and 29(n/2+3), as well as the I/O board 35 of the system board set 29(1) and the system board 30 of the system board set 29(2).

As shown, a domain may be formed of an entire system board set 29(1–n), one or more boards (e.g., system board 30, I/O board 35) from selected system board sets 29(1–n), or a combination thereof. Although not necessary, it may be possible to define each system board set 29(1–n) as a separate domain. For example, if each system board set 29(1–n) were its own domain, the system 10 may conceivably have up to "n" (i.e., the number of system board sets) different domains. When two boards (e.g., system board 30, I/O board 35) from the same system board set 29(1–n) are in different domains, such a configuration is referred to as a "split expander." The expander board 40 of the system board sets 29(1–n), in one embodiment, keeps the transactions separate for each domain. No physical proximity may be needed for boards in a domain.

Using the switch 20, inter-domain communications may be possible. For example, the switch 20 may provide a high-speed communications path so that data may be exchanged between the first domain and the second domain of FIG. 2. In one embodiment, a separate path for data and address through the switch 20 may be used for inter-domain communications.

Figure 3:
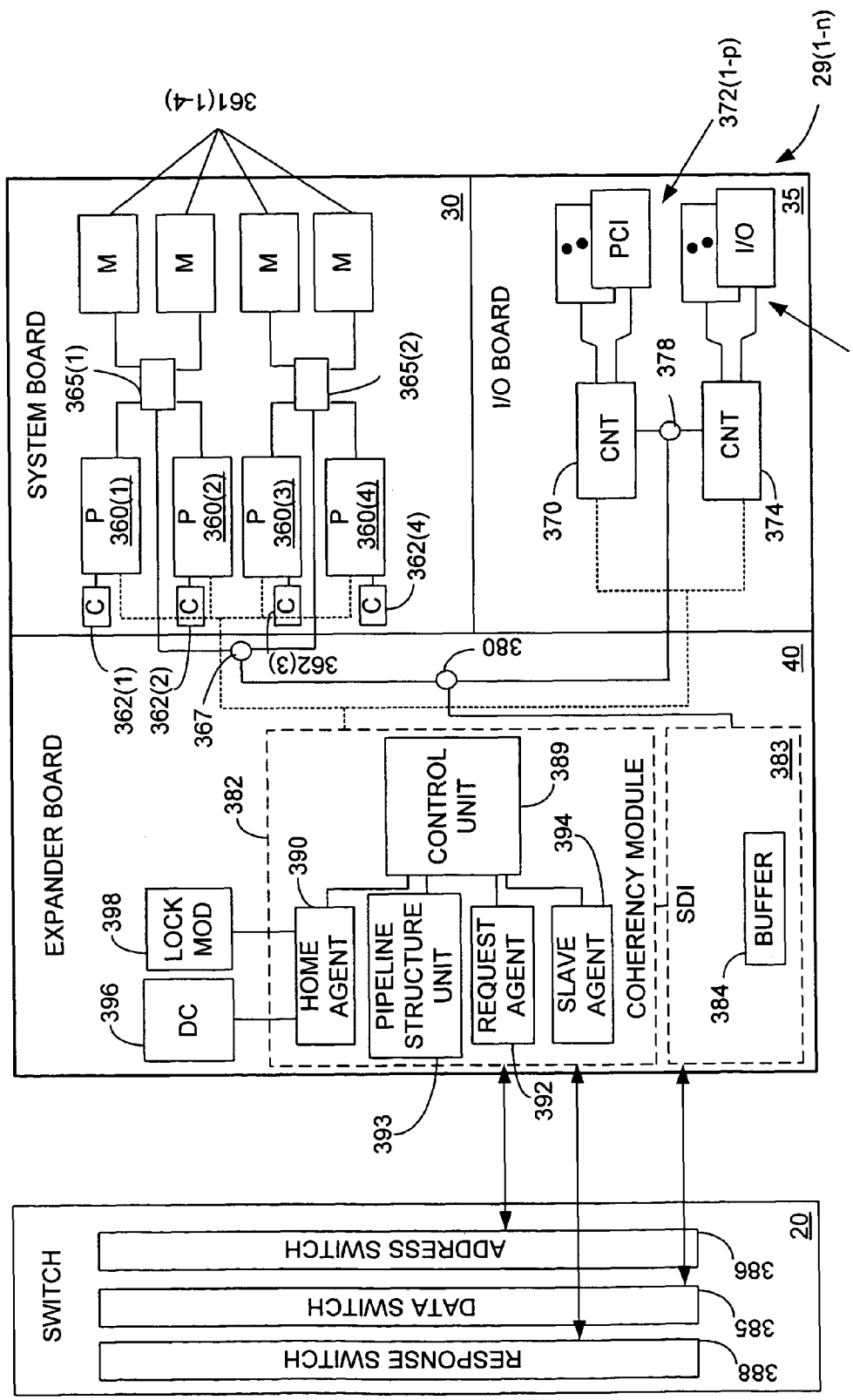
FIG. 3 illustrates a block diagram depiction of a system board set that may be implemented in the system of FIG. 1, in accordance with one illustrative embodiment of the present invention.

Referring now to FIG. 3, a block diagram of the system board set 29(1–n) coupled to the switch 20 is illustrated, in accordance with one embodiment of the present invention. The system board 30 of each system board set 29(1–n) in the illustrated embodiment includes four processors 360(1–4), with each of the processors 360(1–4) having an associated memory 361(1–4). In one embodiment, each of the processors 360(1–4) may be coupled to a respective cache memory 362(1–4). In other embodiments, each of the processors 360(1–4) may have more than one associated cache memories 362(1–4), wherein some or all of the one or more cache memories 362(1–4) may reside within the processors 360(1–4). In one embodiment, each cache memory 362(1–4) may be a split cache, where a storage portion of the cache memory 362(1–4) may be external to the processor, and a control portion (e.g., tags and flags) may be resident inside the processors 360(1–4).

The processors 360(1–4), in one embodiment, may be able to access their own respective memories 361(1–4) and cache memories 362(1–4), as well as access the memories associated with other processors. In one embodiment, a different number of processors and memories may be employed in any desirable combination, depending on the implementation. In one embodiment, two five-port dual data switches 365(1–2) connect the processor/memory pairs (e.g., processors 360(1–2)/memories 361(1–2) and processors 360(3–4)/memories 361(3–4)) to a board data switch 367.

Although not so limited, the I/O board 35 of each system board set 29(1–n) in the illustrated embodiment includes a controller 370 for managing one or more of the PCI cards that may be installed in one or more PCI slots 372(1–p). In the illustrated embodiment, the I/O board 35 also includes a second controller 374 for managing one or more I/O cards that may be installed in one or more I/O slots 376(1–o). The I/O slots 376(1–o) may receive optic cards, network cards, and the like. The I/O board 35, in one embodiment, may communicate with the system control board 15(1–2) (see FIG. 1) over an internal network (not shown).

The two controllers 370, 374 of the I/O board 35, in one embodiment, are coupled to a data switch 378. A switch 380 in the expander board 40 receives the output signal from the data switch 378 of the I/O board 35 and from the switch 367 of the system board set 29(1–n) and provides it to a System Data Interface (SDI) 383, in one embodiment. The SDI 383 may process data transactions to and from the switch 20 and the system board 30 and I/O board 35. A separate address path (shown in dashed lines) is shown from the processors 360(1–4) and the controllers 370, 374 to the coherency module 382. In the illustrated embodiment, the SDI 383 includes a buffer 384, described in more detail below. The coherency module 382 may process address and response transactions to and from the switch 20 and the system and I/O boards 30 and 35.

In one embodiment, the switch 20 may include a data switch 385, address switch 386, and response switch 388 for transmitting respective data, address, and control signals provided by the coherency module 382 or SDI 383 of each expander board 40 of the system board sets 29(1–n). Thus, in one embodiment, the switch 20 may include three 18×18 crossbar switches that provide a separate data path, address path, and control signal path to allow intra- and inter-domain communications. Using separate paths for data, addresses, and control signals, may reduce the interference among data traffic, address traffic, and control signal traffic. In one embodiment, the switch 20 may provide a bandwidth of about 43 Gigabytes per second. In other embodiments, a higher or lower bandwidth may be achieved using the switch 20.

It should be noted that the arrangement and/or location of various components (e.g., coherency module 382, processors 360(1–4), controllers 370, 374) within each system board set 29(1–4) is a matter of design choice, and thus may vary from one implementation to another. Additionally, more or fewer components may be employed without deviating from the scope of the present invention.

In accordance with one embodiment of the present invention, cache coherency is performed at two different levels, one at the intra-system board set 29(1-n) level and one at the inter-system board set 29(1-n) level. With respect to the first level, cache coherency within each system board set 29(1-n) is performed, in one embodiment, using conventional cache coherency snooping techniques, such as the modified, owned, exclusive, shared, and invalid (MOESI) cache coherency protocol. Memory lines transition into the O state from M if another processor 360(1-4) requests a shared copy. A line in the O state cannot be modified, and is written back to memory when victimized. It represents a shared line for which the data in memory is out of date. The processors 360(1-4) may broadcast transactions to other devices within the system board set 29(1-n), where the appropriate device(s) may then respond with the desired results or data.

Because the number of devices within the system board set 29(1-n) may be relatively small, a conventional coherency snooping technique, in which requests are commonly broadcasted to other devices, may adequately achieve the desired objective. However, because the system 10 may contain a large number of system board sets 29(1-n), each having one or more processors 360(1-4), memory accesses may require a large number of broadcasts before such requests can be serviced. Accordingly, a second level of coherency may be performed at the system level (between the expander boards 40) by the coherency module 382 of each expander board 40 using, in one embodiment, the scalable shared memory (SSM) protocol.

The coherency module 382, in one embodiment, includes a control unit 389 coupled to a home agent 390, a request agent 392, and a slave agent 394. Collectively, the agents 390, 392, 394 may operate to aid in maintaining system-wide coherency. In the illustrated embodiment, the control unit 389 of the coherency module 382 interconnects the system board 30 and the I/O board 35 as well as interconnects the home agent 390, request agent 392, and slave agent 394 within the coherency module 382. In one embodiment, if the expander board 40 is split between two domains (i.e., the system and the I/O boards 30 and 35 of one system board set 29(1-n) are in different domains), the control unit 389 of the coherency module 382 may arbitrate the system board 30 and I/O board 35 separately, one on odd cycles and the other on even cycles.

The coherency module 382 may also include a pipeline structure unit 393 that is capable of providing a pipeline structure for executing transactions requested by various portions of the system 10. Tasks handled by the request agent 392 and/or the home agent 390 may be positioned in a pipeline format by the pipeline structure unit 393. In one embodiment, on substantially every system clock cycle, a new transaction is moved into the pipeline provided by the pipeline structure unit 393 such that a portion of a requested transaction is performed on each system clock cycle. Performing a portion of a transaction on substantially every system clock cycle increases the bandwidth of the SSM protocol. A more detailed description of increasing the bandwidth of the SSM protocol is provided below. The pipeline structure unit 393 may be a software, hardware, or firmware unit that is a standalone unit or may be integrated into a control unit 389. The pipeline structure unit 393 may be implemented into various portions of the system 10, including the expander board 40, the system board 30, and/or the I/O board 35.

The SSM protocol uses MTags embedded in the data to control what the devices under the control of each expander board 40 can do to a cache line. The MTags may be stored in the caches 362(1-4) and/or memories 361(1-4) of each system board set 29(1-n). Table 1 below illustrates three types of values that may be associated with MTags.

TABLE 1

| MTag Type | Description |
|---|---|
| Invalid (gI) | No read or write allowed for this type of line. A device must ask for a new value before completing an operation with this line. |
| Shared (gS) | A read may complete, but not a write. |
| Modifiable (gM) | Both reads and writes are permitted to this line. |

As mentioned, the Mtag states are employed in the illustrated embodiment in addition to the conventional MOESI cache coherency protocol. For example, to do a write, a device should have a copy of the line that is both M and gM. If the line is gM but not M, then the status of the line may be promoted to M with a transaction within the expander board 40. If the line is not gM, then a remote transaction may have to be done involving the cache coherency module 382, which, as mentioned, employs the SSM protocol in one embodiment.

The coherency module 382, in one embodiment, controls a directory cache (DC) 396 that holds information about lines of memory that have been recently referenced using the SSM protocol. The DC 396, in one embodiment, may be stored in a volatile memory, such as a static random access memory (SRAM). The DC 396 may be a partial directory in that it may not have enough entry slots to hold all of the cacheable lines that are associated with a given expander board 40. As is described in more detail later, the coherency module 382, in one embodiment, controls a locking module 398 that prevents access to a selected entry in the directory cache 396 when the status of that entry, for example, is being updated.

The DC 396 may be capable of caching a predefined number of directory entries corresponding to cache lines of the caches 362(1-4) for a given system board 30. The DC 396 may be chosen to be of a suitable size so that a reasonable number of commonly used memory blocks may generally be cached. Although not so limited, in the illustrated embodiment, the DC 396 is a 3-way set-associative cache, formed of three SRAMs that can be read in parallel. An exemplary 3-wide DC entry is shown in FIG. 4A. The DC 396, in one embodiment, includes 3-wide DC entries (collectively referred to as a "set") 410. Each DC entry in a given set 410 may be indexed by a partial address.

As shown in FIG. 4A, in one embodiment, each of the three DC entry fields 415(0-2) has an associated address parity field 420(0-2). Each set 410 includes an error correction code (ECC) field 425(0-1). In case of errors, the ECC field 425(0-1) may allow error correction, in some instances. Each 3-wide DC entry in a given set 410 includes a least recently modified (LRM) field 430 that may identify which of the three DC entry fields 415(0-2) was least recently modified. Although other encoding techniques may be employed, in the illustrated embodiment, three bits are used to identify the LRM entry. An exemplary list of LRM codes employed in the illustrated embodiment is provided in Table 2 below.

TABLE 2

DC Least-Recently-Modified encoding

| LRM | Most Recent | Middle | Least Recent |
|---|---|---|---|
| 000 | Entry 0 | Entry 1 | Entry 2 |
| 001 | Entry 1 | Entry 0 | Entry 2 |
| 010 | Entry 2 | Entry 0 | Entry 1 |
| 011 | ***undefined state *** | | |
| 100 | Entry 0 | Entry 2 | Entry 1 |

TABLE 2-continued

DC Least-Recently-Modified encoding

| LRM | Most Recent | Middle | Least Recent |
|---|---|---|---|
| 101 | Entry 1 | Entry 2 | Entry 0 |
| 110 | Entry 2 | Entry 1 | Entry 0 |
| 111 | *** undefined state *** | | |

As indicated in the exemplary LRM encoding scheme of Table 2, various combinations of bits in the LRM field 430 identify the order in which the three entry fields 415(0-2) in the DC 396 were modified. As an example, the digits '000' (i.e., the first entry in Table 2), indicate that the entry field 415(2) was least recently modified, followed by the middle entry field 415(1), and then the first entry field 415(0), which was most recently modified. As an added example, the digits '101' indicate that the entry field 415(0) was least recently modified, followed by the entry field 415(2), and then the entry field 415(1), which was most recently modified. As described later, the LRM field 430, in one embodiment, is utilized, in part, to determine which DC entry field 415(0-2) to victimize from a particular set 410 of the DC 396 when that set 410 is full.

In accordance with one embodiment of the present invention, two different types of entries, a shared entry 435 and an owned entry 437, may be stored in the entry fields 415(0-2) of the DC 396, as shown in FIGS. 4B-C. An owned entry 437, in one embodiment, signifies expander board 40 has both read and write access for that particular entry. A shared entry 435, in one embodiment, indicates that one or more expander boards 40 have read, but not write, access for that particular entry.

The shared entry 435, in one embodiment, includes an identifier field 440, a mask field 445, and an address tag field 450. The identifier field 440, in the illustrated embodiment, is a single bit field, which, if equal to bit 1, indicates that the stored cache line is shared by one or more of the processors 360(1-4) of the system board sets 29(1-n) in the system 10. The mask field 445, which may have up to "n" bits (i.e., one bit for each of the system board sets 29(1-n)), identifies through a series of bits which of the system boards 30 of the system board sets 29(1-n), has a shared copy of the cache line. The address tag field 450 may store at least a portion of the address field of the corresponding cache line, in one embodiment.

The owned entry 437 includes an identifier field 455, an owner field 460, an address tag field 465, a valid field 470, and a retention bit field 475, in one embodiment. The identifier field 455, in the illustrated embodiment, is a single bit field, which, if equal to bit 0, indicates that the stored cache line is owned by the named expander in the system 10. The owner field 460 is adapted to store the identity of a particular expander board 40 of the system board sets 29(1-n) that holds the valid copy of the cache line. The address tag field 465 may be adapted to store at least an identifying portion of the address field of the corresponding cache line, in one embodiment. For example, the tag field 465 may be comprised of the upper order bits of the address. The valid field 470, in one embodiment, indicates if the corresponding entry in the DC 396 is valid. An entry in the DC 396 may be invalid at start-up, for example, when the system 10 or domain in the system 10 is first initialized. If the invalid bit is "0," an actual ownership of a line by a named expander is recorded in the owner field 460.

Figure 5:
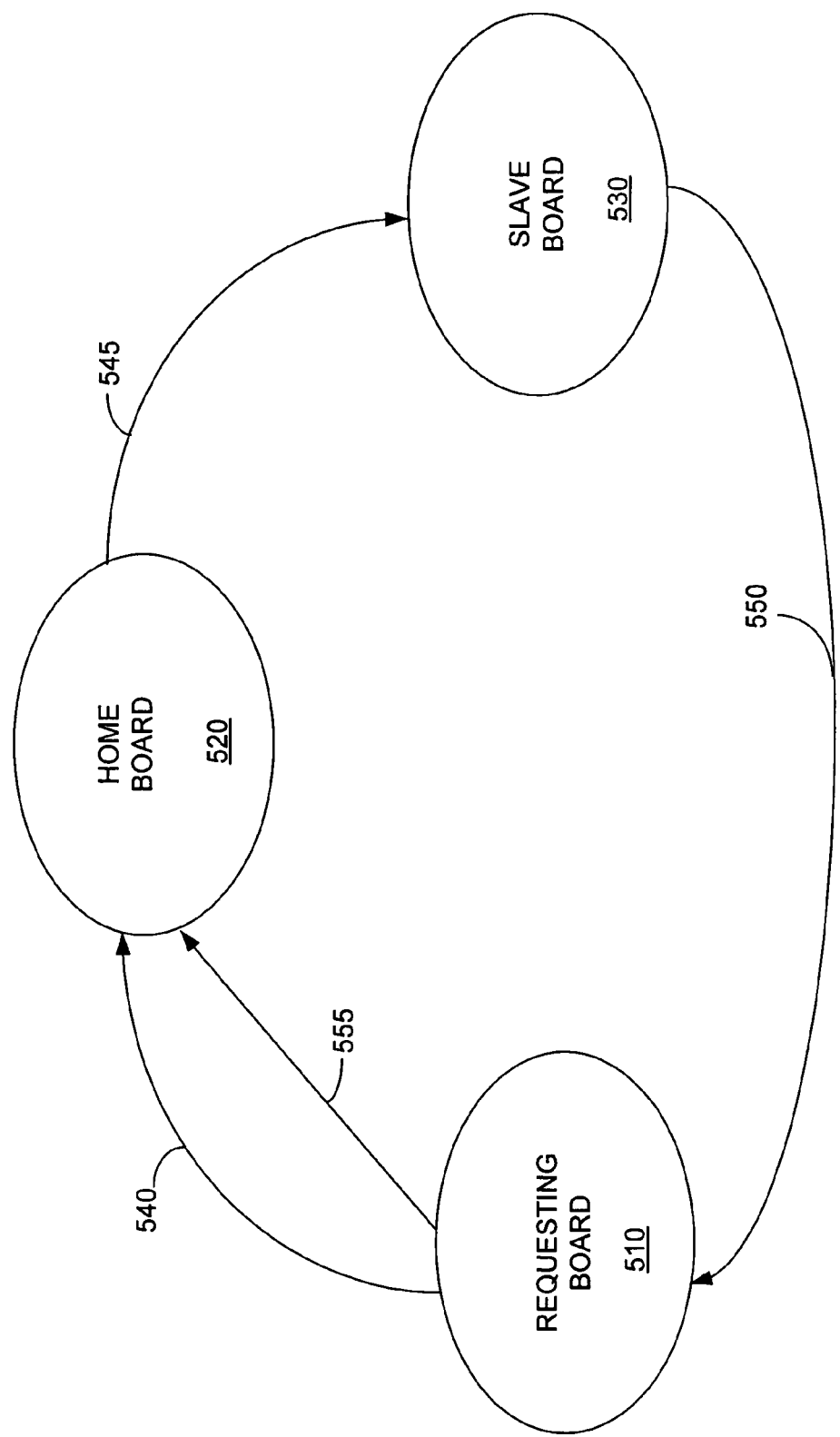
FIG. 5 illustrates a state diagram including the various communication paths between one or more boards of the system of FIG. 1, in accordance with one illustrative embodiment of the present invention.

Referring now to FIG. 5, a state diagram including the various communication paths between a requesting board 510, a home board 520, and slave board 530 in servicing memory access requests is illustrated, in accordance with one or more embodiments of the present invention. The boards 510, 520, 530, in one embodiment, may include one or more boards (e.g., expander board 40, system board 30, I/O board 35) of one or more control board sets 29(1-n). The term "memory access requests," as utilized herein, may include, in one embodiment, one or more of the processors 360(1-4) (see FIG. 3) of a given system board set 29(1-n) accessing one or more caches 362(1-4) or memories 361(1-4) in the system 10.

Although the invention is not so limited, for the purposes of this discussion, it is herein assumed that one domain is configured in the system 10 that is formed of one or more complete (i.e., no split expanders) system board sets 29(1-n). Generally, a given cache line in the system 10 is associated with one home board 520. The requesting board 510 in the illustrated embodiment represents a board attempting to access a selected cache line. The slave board 530 in the illustrated embodiment represents a board that currently has a copy of a cache line that the requesting board 510 is attempting to access. In a case where a current copy of a requested cache line resides in the home board 520, then the home board 520 is also the slave board 530 for that transaction.

The requesting board 510 may initiate one of a variety of memory access transactions, including request-to-own (RTO), request-to-share (RTS), WriteStream, WriteBack, and ReadStream transactions. One or more of the aforementioned memory access transactions may be local or remote transactions, where local transactions may include transactions that are broadcast locally within the system board set 29(1-n) and remote transactions may include transactions that are intended to access cache lines from other system board sets 29(1-n). Although not so limited, in one embodiment, an RTO may be issued to obtain an exclusive copy of a cache line, an RTS to obtain a shared copy of a cache line, a WriteBack transaction to write the cached line back to the home board, a ReadStream request to get a snapshot copy of the cache line, and a WriteStream request to write a copy of the cache line.

For illustrative purposes, an exemplary RTO transaction among the boards 510, 520, and 530 is described below. For the purpose of this illustration, it is herein assumed that the requesting board 510 is attempting to obtain write-access to a cache line owned by the home board 520, where the latest copy of the requested cache line resides on the slave board 530. The RTO from the requesting board 510 is forwarded to the home board 520 via path 540. Forwarding of the RTO from the requesting board 510 to the home board 520 is typically handled by the coherency module 382 (see FIG. 3) of the requesting board 510 utilizing the address provided with the RTO.

The requesting board 510 determines which of the home boards 520 has the requested cache line by, for example, mapping the address of the cache line to the address ranges of the caches associated with the various expander boards 40 within the system 10. When the home board 520 receives the RTO message over the path 540, the coherency module 382 of the home board 520 checks its directory cache 396 (see FIG. 3) to determine if there is an entry corresponding to the requested cache line. Assuming that an entry exists in the directory cache 396, the home board 520 may reference the information stored in that entry to determine if the slave board 530 currently has an exclusive copy of the requested cache line. It should be noted, in one embodiment, that while the directory cache 396 of the home board 520 is being referenced, the coherency module 382 may use the locking module 398 to at least temporarily prevent other expander boards 40 from accessing that entry in the directory cache 396.

Based on the information stored in the directory cache 396, the home board 520 is able to ascertain, in one embodiment, that the slave board 530 currently has an exclusive copy of the cache line. Accordingly, the home board 520, in one embodiment, transmits a request over a path 545 to the slave board 530 to forward a copy of the requested cache line to the requesting board 510. In one embodiment, the slave board 530 downgrades its copy from an exclusive copy (i.e., M-type) to an invalid copy (i.e., I-type) since, by definition, if one board in the system 10 has an exclusive M-copy (i.e., the requesting board 510 in this case), all other nodes should have invalid I-copies.

When the requesting board 510 receives a copy of the cache line over a path 550, it internally notes that it now has an exclusive M-copy and acknowledges over a path 555. When the home board 520 receives the acknowledgment message from the requesting board 510 over the path 555, the home board 520 updates its directory cache 396 to reflect that the requesting board 510 now has write-access to the cache line, and may use the locking module 398 to allow other transactions involving the cache line to be serviced. The paths 540, 545, 550, and 555, in one embodiment, may be paths through the switch 20 (see FIGS. 1 and 3).

As other transactions occur for accessing cache lines in the home board 520, for example, the coherency module 382 of the home board 520 routinely may update its directory cache 396 to reflect the status of the referenced cache lines. The status of the referenced cache lines may include information regarding the state of the cache line (e.g., M, I, S), ownership rights, and the like. At any given time, because of the finite size of the directory cache 396, it may be possible that a particular set 410 within the directory cache 396 may be full. When a particular set 410 within the directory cache 396 is full, it may be desirable to discard or overwrite old entries to store new entries since it may be desirable to retain some entries in the directory cache 396 over others.

Embodiments of the present invention provide for servicing at least a portion of a transaction between the requesting boards 510, the home board 520, and/or the slave board 530 in response to virtually every clock cycle.

Figure 6:
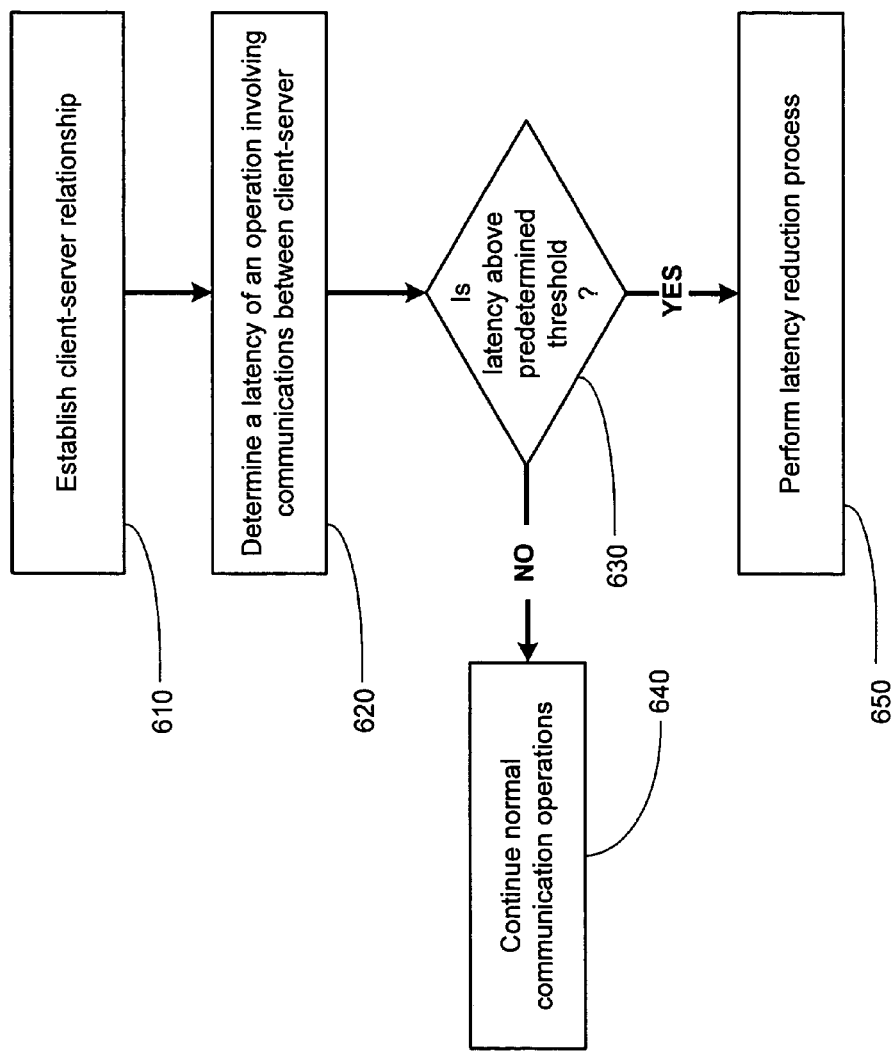
FIG. 6 illustrates a flowchart depiction of the method in accordance with one illustrative embodiment of the present invention.

Turning now to FIG. 6, a flow chart depiction of the methods in accordance with one illustrative embodiment of the present invention is provided. The system 10 provides for developing a client/server relationship between the requesting board 510 and the home board 520 and/or the slave board 530 for executing transactions, such as memory transactions (block 610). For example, the requesting board 510 may initiate a memory access transaction and a write back transaction to write the cache line back to the home board 520. The transaction may be queued in response to a determination that the home agent 390 in the coherency module 382 is not prepared to execute the requested transaction.

The system 10 may then determine a latency of operation related to the communications between the client/server described above (block 620). The system 10 may calculate or determine that the latency may be above a predetermined threshold (block 630). The latency threshold may depend upon a predetermined acceptable latency set by the system 10. When the system 10 determines that the latency is at or below the predetermined threshold, normal communication described above is continued (block 640). However, when the system 10 determines that the latency is above the predetermined threshold, a latency reduction process in response to the latency is implemented by the system 10 (block 650).

Embodiments of the present invention provide for implementing a high-bandwidth, low-latency communications protocol. For example, pipeline structures may be set-up such that during virtually every clock cycle, a new transaction may be moved into position into the pipeline structure described above, to perform the requested portion of the transaction function. In one embodiment, the pipeline structure unit 393 is used by the system 10 to utilize substantially every clock cycle to perform at least a portion of the requested transaction. A more detailed description and illustration of the latency reduction process indicated in block 650 of FIG. 6, is provided in FIG. 7.

Figure 7:
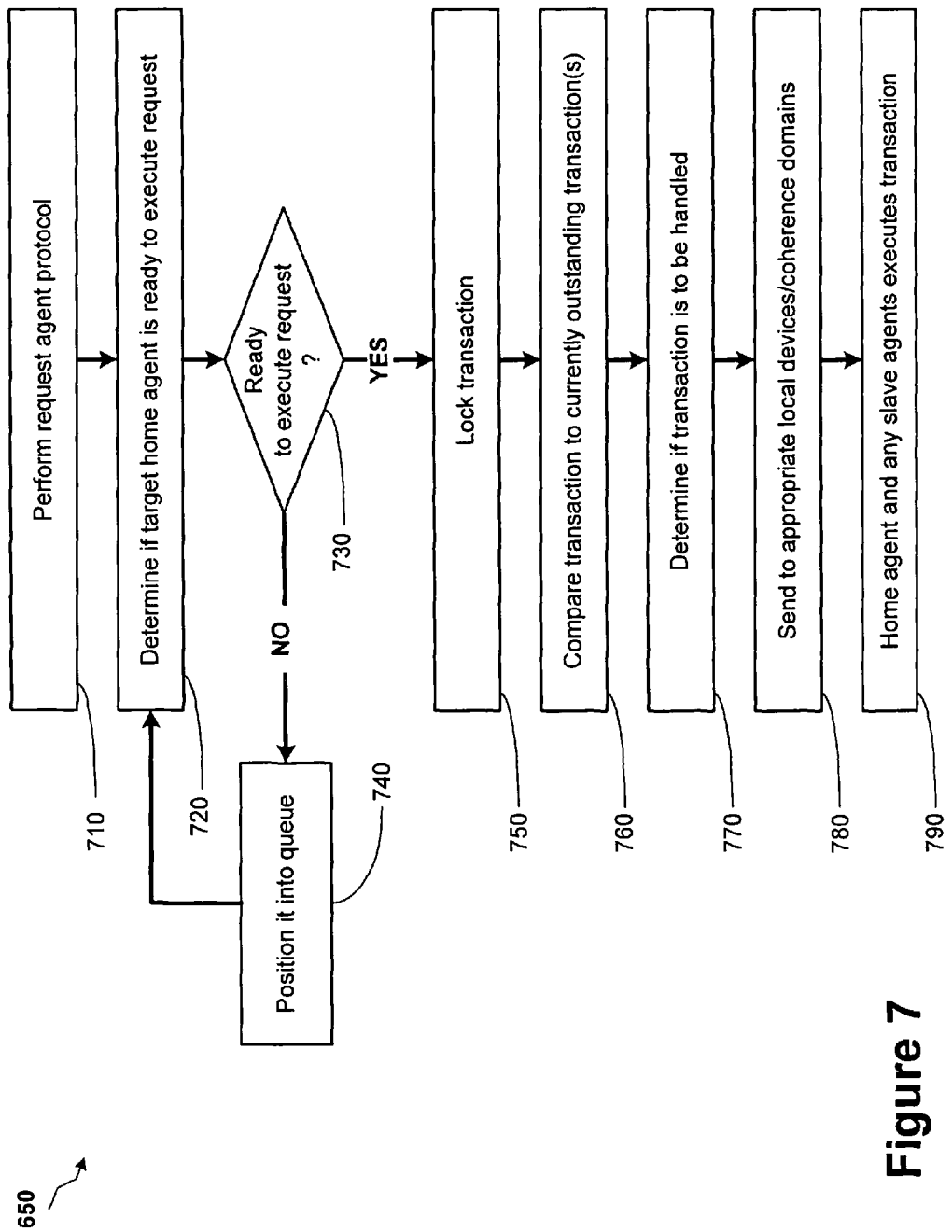
FIG. 7 illustrates a more detailed flowchart depiction of the step of performing a latency reduction process, as indicated in FIG. 6, in accordance with one illustrative embodiment of the present invention.

Turning now to FIG. 7, a flowchart depiction of the methods for performing a client/server transaction in accordance with an illustrative embodiment of the present invention is provided. When the system 10 receives a request for a transaction, such as a memory transaction, a request agent protocol is performed (block 710). The request agent protocol involves searching for a transaction to be handled by the SSM protocol. A more detailed description of the request agent protocol is provided in FIG. 8 and accompanying description below.

Upon performing the request agent protocol, the system 10 determines if the target home agent 390 of one of the boards 510, 520, 530 is ready to execute the request (block 720, 730). If the target home agent 390 is not ready to execute the requested transaction, the transaction is placed into a queue (block 740). The requested transaction is removed from the queue when the target home agent 390 is ready to execute the transaction. When the home agent 390 is ready to execute the transaction request, the system 10 performs a lock transaction (block 750). In one embodiment, the system 10 may use the locking module 398 to prevent other entities in the system 10 from accessing a particular entry in the directory cache 396 of the target home board 520.

The system 10 then compares the transaction that is requested to currently outstanding transactions (block 760). A record of transactions that indicates currently outstanding transactions is used to compare the current requested transaction to see if its address matches with a transaction that is already being handled by the system 10. Even if an exhaustive transaction list is not available for all addresses, a selected number of transactions may be recorded, such that a rapid determination may be made, whether a particular requested transaction is to be handled (block 770).

Generally, an efficient transaction list may be used to compare the requested transaction within one clock cycle to make a fast determination whether a particular transaction is to be handled. The pipeline structure described above may be used to move each new transaction into a position in the pipeline, such that during virtually every clock cycle, a portion of the requested transaction is executed. Within a clock cycle of encountering the transaction, the system 10 may determine that there is an address match resulting from the transaction comparison. The matched address may then be sent to a local device and to the local coherency module 382, which may look up the address in the coherence directory cache (block 780). The system 10 then prepares to execute the requested transaction. The target home agent 390 and any slave agents 394 may then execute at least a portion of the transaction (block 790).

The home agent 390 and any slave agents 394 may then send responses to the request agent 392 that it looks up the nature of the transaction that is being referred to and completes the transaction to the requesting processor or I/O device, and then sends a further response back to the home agent 390 to have it unlock the transaction when the unlocking of the transaction is appropriate. For example, in order to read data from memory, the interchange between the home agent 390, the slave agent 394, and the requesting request agent 392 operates such that rather than having the home agent 390 maintain this transaction in a wait state, embodiments of the present invention provide for a protocol engine (e.g., the pipeline structure unit 393) that sends the transaction to a queuing structure. The requested transaction is then recycled back to the protocol engine at a later time, where there is a further step to be accomplished in the protocol. Meanwhile, on every intervening clock cycle, another transaction may be passed through the protocol cycle such that all clock cycles are utilized to move a requested transaction forward. Therefore, the bandwidth of the SSM protocol is increased and more efficient transactions in the system 10 may take place.

Figure 8:
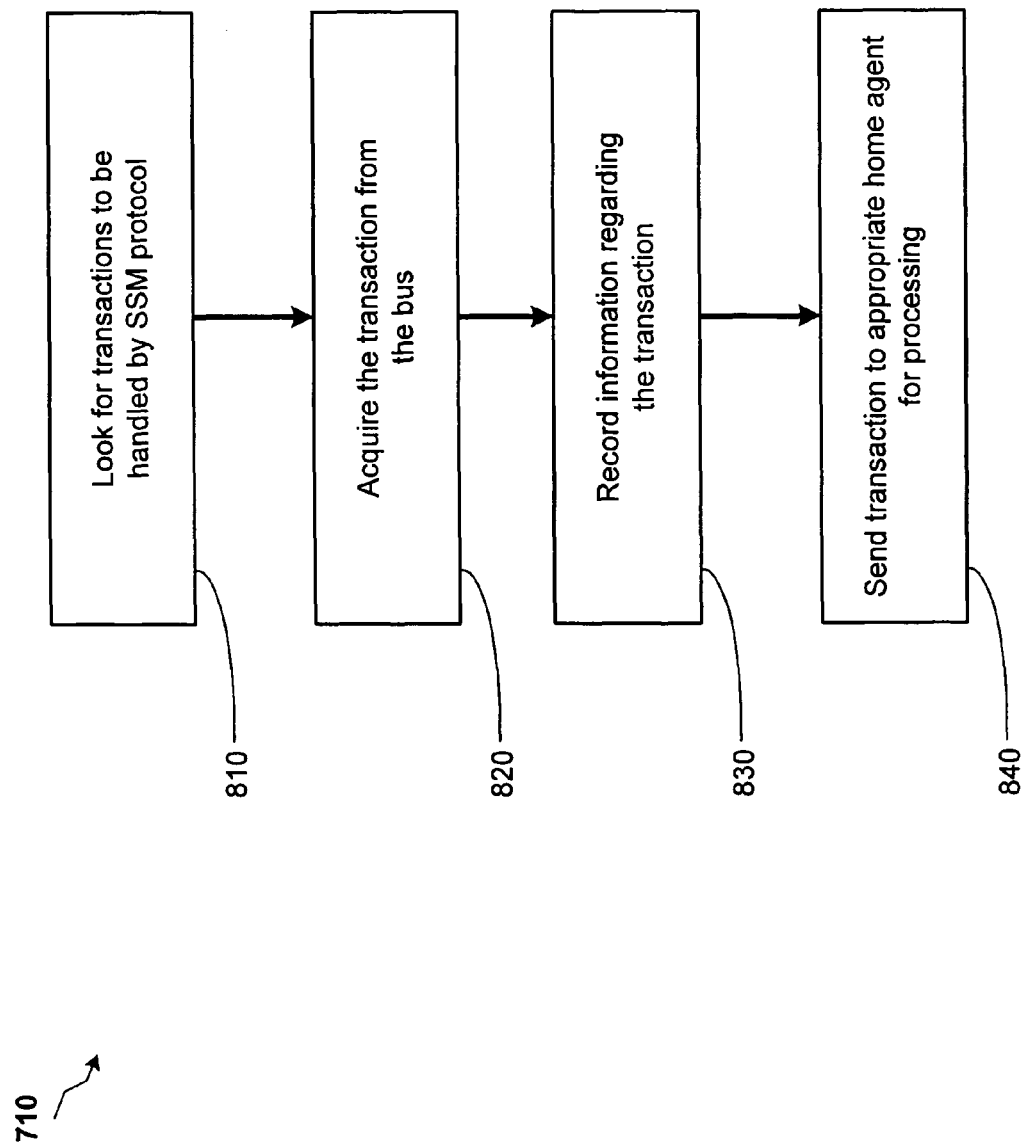
FIG. 8 illustrates a more detailed flowchart depiction of the step of performing a request agent protocol, as indicated in FIG. 7, in accordance with one illustrative embodiment of the present invention.

Turning now to FIG. 8, a block diagram depiction of the step of performing the request agent protocol indicated in block 710 of FIG. 7 is illustrated. The system 10 may look for transactions to be handled by the SSM protocol based upon a requested transaction (block 810). This function may be performed by the request agent 392. The transaction is then acquired from a bus that interconnects the various components of the system 10 (block 820). Information regarding the transaction may then be recorded for later comparison with other requested transactions (block 830). The transaction is then sent to an appropriate home agent 390 for processing (block 840).

The requested transaction may be sent to the switch 20, which comprises a centerplane, such that the data regarding the transaction goes through the centerplane and then drives another coherency module 382, but at the home agent 390. At that position, it is queued up to determine whether the home agent 390 is ready to execute the transaction. A pipeline structure 393 is used such that for virtually every clock cycle a new transaction moves into each position of the pipeline to perform a portion of the requested transaction function, therefore it may be queued such that it may be recycled back to the protocol cycle at a later time. During this time, other intervening clock cycles are used to perform other transactions that are passed through the protocol cycle. Completion of the steps described in FIG. 8 substantially completes the process of performing the request agent protocol indicated in block 710 of FIG. 7.

For ease of illustration, several references to "cache line(s)" or "line(s)" are made in the discussion herein with respect to memory access. It should be appreciated that these references, as utilized in this discussion, may refer to any line that is cacheable, and include one or more bits of information that is retrieved from the caches 362(1–4) and/or memories 361 (1–4) (see FIG. 3) in the system 10.

The various system layers, routines, or modules may be executable control units (such as control unit 389 (see FIG. 3). Each control unit 389 may include a microprocessor, a microcontroller, a digital signal processor, a processor card (including one or more microprocessors or controllers), or other control or computing devices.

The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   receiving a request from a first domain to access a second domain during a first clock cycle; and
   in response to determining that a latency of operation relating to said request is longer than a predetermined latency, using a pipeline structure to perform at least a portion of said request during a clock cycle immediately following said first clock cycle; and
   in response to determining that the latency of operation relating to said request is less than or equal to said predetermined latency, using a normal communication protocol, that does not include the pipeline structure, to perform said request.

2. The method of claim 1, further comprising using a third domain to access said second domain in response to receiving said request from said first domain.

3. The method of claim 2, wherein using said third domain to access said second domain comprises:
   copying data from said second domain;
   providing said data to said first domain; and
   providing an indication to said first domain in response to providing said data.

4. The method of claim 3, wherein providing the indication comprises generating an interrupt in response to providing the data.

5. The method of claim 1, wherein receiving said request from said first domain to access said second domain further comprises receiving a request to access a resource of said second domain.

6. The method of claim 5, wherein said resource is an interface, and wherein receiving said request further comprises receiving a request to access said interface of said second domain to communicate with one or more external devices.

7. The method of claim 1, wherein receiving said request from said first domain to access said second domain further comprises receiving said request to access data from a memory associated with said second domain.

8. A method, comprising:
   receiving a request from a first domain to access a second domain during a first clock cycle;
   determining whether a latency of operation relating to said request is above a predetermined threshold;
   performing a latency reduction process in response to said determination that said latency of operation relating to said request is longer than a predetermined latency, said latency reduction process comprising using a pipeline protocol to perform at least a portion of said request during a clock cycle immediately following said first clock cycle; and
   accessing the second domain without the pipeline protocol in response to said determination that said latency of operation relating to said request is less than or equal to said predetermined latency.

9. The method of claim 8, further comprising establishing a client-server relationship between said first domain and said second domain in response to receiving said request from said first domain to access said second domain.

10. The method of claim 9, wherein receiving said request from said first domain to access said second domain further comprises receiving a request to access a resource of said second domain.

11. The method of claim 9, wherein performing said latency reduction process further comprises placing at least a portion of a transaction between said client-server relationship into a pipeline structure.

12. The method of claim 9, placing at least a portion of a transaction between said client-server relationship into a pipeline structure further comprises executing at least one portion of said transaction during substantially consecutive clock cycles.

13. An apparatus, comprising:
an interface; and
a control unit communicatively coupled to said interface, wherein said control unit is adapted to:
receive a request from a first domain for data that is storable in a resource associated with a second domain during a first clock cycle;
access said data from the resource associated with said second domain using a pipeline structure unit in response to a determination that a latency of operation relating to said request is longer than a predetermined latency;
provide said data to said first domain based upon a pipeline structure provided by said pipeline structure unit;
provide an indication to said first domain in response to providing said data; and
access said data from the resource associated with said second domain without using the pipeline structure unit in response to a determination that a the latency of operation relating to said request is less than or equal to said predetermined latency.

14. The apparatus of claim 13, wherein said pipeline structure unit is adapted to pipeline a plurality of portions of a transaction request for execution.

15. The apparatus of claim 14, wherein said pipeline structure unit executes at least one portion of said transaction request during substantially consecutive clock cycles.

16. The apparatus of claim 13, wherein said resource associated with said second domain comprises a memory associated with said second domain.

17. The apparatus of claim 13, wherein said control unit reads said data from the memory of said second domain and copies said data into a memory associated with said first domain using said pipeline structure.

18. The apparatus of claim 17, wherein said control unit further allows said first domain to access a resource of a second domain.

19. The apparatus of claim 18, wherein said resource of said second domain is an interface, and wherein said control unit allows said first domain to access the interface to communicate with one or more external devices using said pipeline structure.

20. The apparatus of claim 13, wherein the interface is adapted to receive Internet Protocol data packets.

21. The apparatus of claim 13, wherein said pipeline structure unit is integrated into said control unit.

22. An apparatus, comprising:
means for receiving a request from a first domain to access a second domain during a first clock cycle; and
means for determining whether a latency of operation relating to said request is longer than a predetermined latency;
means for using a pipeline structure to perform at least a portion of said request during a clock cycle immediately following said first clock cycle in response to determining that said latency of operation relating to said request is longer than said predetermined latency; and
means for performing at least a portion of said request without using said pipeline structure in response to determining that said latency of operation relating to said request is less than or equal to said predetermined latency.

23. A computer readable program storage device encoded with instructions that, when executed by a computer, performs a method, comprising:
receiving a request from a first domain to access a second domain during a first clock cycle; and
in response to determining that a latency of operation relating to said request is longer than a predetermined latency, using a pipeline structure to perform at least a portion of said request during a clock cycle immediately following said first clock cycle; and
in response to determining that the latency of operation relating to said request is less than or equal to said predetermined latency, using a normal communication protocol, that does not include the pipeline structure, to perform said request.

24. The computer readable program storage device encoded with instructions that, when executed by a computer, performs the method of claim 23, the method further comprising using a third domain to access said second domain in response to receiving said request from said first domain.

25. The computer readable program storage device encoded with instructions that, when executed by a computer, performs the method of claim 24, wherein using said third domain to access said second domain comprises:
copying data from said second domain;
providing said data to said first domain; and
providing an indication to said first domain in response to providing said data.

26. The computer readable program storage device encoded with instructions that, when executed by a computer, performs the method of claim 25, wherein providing the indication comprises generating an interrupt in response to providing the data.

27. The computer readable program storage device encoded with instructions that, when executed by a computer, performs the method of claim 23, wherein receiving said request from said first domain to access said second domain further comprises receiving a request to access a resource of said second domain.

28. The computer readable program storage device encoded with instructions that, when executed by a computer, performs the method of claim 27, wherein said resource is an interface, and wherein receiving said request further comprises receiving a request to access said interface of said second domain to communicate with one or more external devices.

29. The computer readable program storage device encoded with instructions that, when executed by a computer, performs the method of claim 23, wherein receiving said request from said first domain to access said second domain further comprises receiving said request to access data from a memory associated with said second domain.

* * * * *